July 3, 1951 P. R. LEON 2,558,906
TRAILER HITCH
Filed April 4, 1950
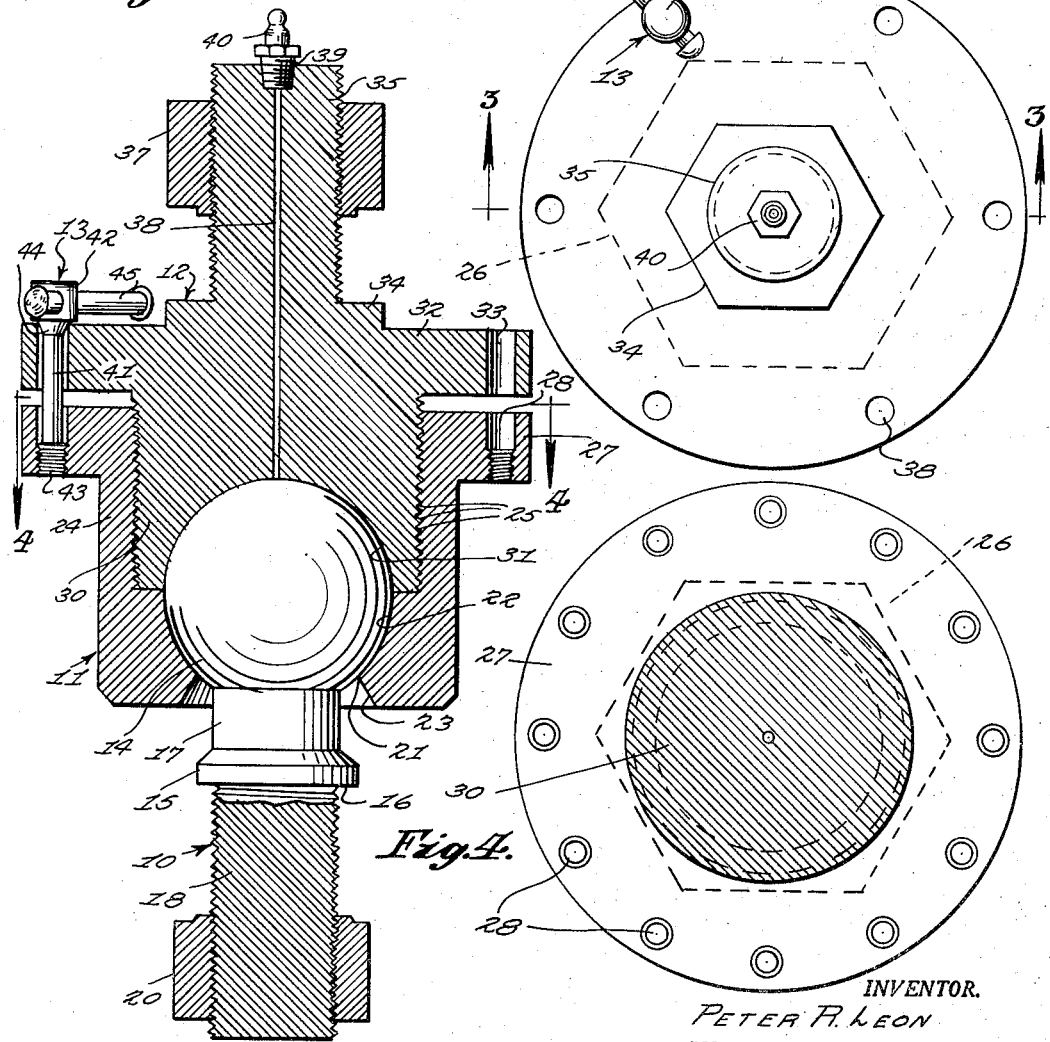
INVENTOR.
PETER R. LEON
BY
McMorrow, Berman + Davidson
ATTORNEYS Patented July 3, 1951

2,558,906

UNITED STATES PATENT OFFICE 2,558,906

TRAILER HITCH

Peter R. Leon, Schooleys Mountain, N. J.

Application April 4, 1950, Serial No. 153,948

2 Claims. (Cl. 280—33.17)

This invention relates to trailer hitches and more particularly to a universal joint hitch for connecting a trailer, such as a house trailer, to a towing vehicle, such as an automobile.

It is among the objects of the invention to provide a trailer hitch which comprises a minimum number of simple parts and has greater strength in proportion to its weight than has heretofore been obtained, which can be positively locked in a condition of accurate adjustment to eliminate any play or looseness between the parts and preclude accidental separation of the coupled parts of the hitch, which is easy to couple and adjust and to uncouple, which provides for adequate lubrication of its relatively movable parts, and which is economical to manufacture and readily attachable to trailer tongues and automobile carried bracket of known construction.

Other objects and advantages will become apparent from a consideration of the following description and the appended claims in conjunction with the accompanying drawings, wherein:

Figure 1 is a side elevational view of a trailer hitch illustrative of the invention shown in operative association with a trailer tongue and a bracket adapted to be attached to a towing vehicle;

Figure 2 is a top plan view of an enlarged scale of the trailer hitch illustrated in Figure 1;

Figure 3 is a longitudinal cross sectional view on the line 3—3 of Figure 2; and, Figure 4 is a transverse cross sectional view on the line 4—4 of Figure 3.

With continued reference to the drawing the trailer hitch therein illustrated comprises, in general, a ball bolt 10, a hollow or female socket member 11, a plug or male solid member 12 and a locking bolt 13.

The ball bolt 10 has at one end a spherical ball 14 and has adjacent the ball an annular collar 15 the side of which remote from the ball provides a shoulder 16. A neck 17 is included between the ball 14 and the collar 15 and this bolt further includes a screw threaded shank 18 at the side of the collar 15 remote from the ball 14. The shank 18 of the bolt 10 is passed through a bolt receiving hole in the bracket 19 so that the shoulder 16 rests on the upper surface of the bracket surrounding the bolt receiving hole therein and a nut 20 is threaded onto the shank 18 below the bracket 19 to firmly secure the ball bolt to the bracket.

The socket member 11 comprises a hollow body having in one end an aperture 21 through which the shank, collar and neck of the ball bolt may be passed and a partly spherical socket or concavity 22 surrounding the aperture 21 and receiving the portion of the ball 14 adjacent the collar 15. The aperture 21 is large enough for the collar 15 to pass therethrough and is bevelled at its outer end, as indicated at 23, to provide a limited freedom of universal movement of the socket member 11 relative to the ball 14 before the wall of the aperture 21 contacts the neck 17 of the ball bolt. An annular wall 24 extends from the end of the body 11 in which the aperture 21 is provided in surrounding relationship to the concavity 22 and is provided with internal screw threads 25. The outer surface of the wall 24 is made non-circular, preferably hexagonal, as indicated by the dotted lines in Figure 2, to receive a wrench for rotating this member of the socket. An outwardly extending annular flange 27 is provided at the end of the side wall 24 opposite the concavity 22 and this flange is provided with a plurality of angularly spaced apart, internally screw threaded apertures 28 for the reception of the locking bolt 13. In the arrangement illustrated there are twelve apertures 28 spaced apart at substantially equal angular intervals of thirty degrees but the number of these apertures may be increased or decreased from the number illustrated without in any way exceeding the scope of the invention.

The socket member 12 comprises an externally screw threaded plug portion 30 which is threaded into the internally screw threaded wall 24 of the member 11 and has in one end a partly spherical concavity 31 which receives the portion of the ball 17 remote from the collar 15 on the ball bolt 10. An annular flange 32 projects outwardly from the plug 30 at the end of the plug remote from the concavity 31 and this flange 32 is provided with a plurality of angularly spaced apart apertures 33. In the arrangement illustrated there are six apertures 33 spaced around the flange 32 at substantially equal angular intervals of sixty degrees but the number of these apertures may also be increased or decreased without in any way exceeding the scope of the invention.

A boss 34 of non-circular, preferably hexagonal shape, is provided on the end of the plug portion 30 remote from the concavity 31 and a screw threaded shank 35 extends outwardly from this boss substantially coaxial with the plug portion 30. The shank 35 is received in an aperture provided near the end of the trailer tongue 36 and a nut 37 is threaded down on the shank 35 to secure the socket member 12 firmly to the trailer tongue.

In mounting the socket portion 12 on the trailer tongue a wrench may be applied to the boss 34 to hold the socket member 12 against rotation while the nut 37 is being tightened.

A small bore 38 extends through the shank 35 and the plug portion 30 from the outer end of the shank to the concavity 31 and this bore is provided at the outer end of the shank with a screw threaded counter bore 39. A grease fitting 40 of known construction is threaded into the counter bore 39 to provide a supply of lubricant to the concavity 31 through the bore 38.

When the trailer is uncoupled from the towing vehicle the socket portion 12 will be removed from the socket portion 11 but the socket portion 11 will be in association with the ball bolt 10. When it is desired to couple the trailer one or both of the vehicles are moved until the socket portion 12 can be placed on the ball 14 so that the upper part of the ball is received in the cavity 31. The socket member 11 is then raised and threaded upwardly on the plug portion 30 of the socket member 12 until the partly spherical concavity 22 in the socket member 11 is brought into contact with the lower portion of the ball. A suitable wrench may be applied to the socket member 11, as explained above, to effect the proper adjustment between the two socket members to clamp the ball firmly between these members yet permit freedom of movement of the ball in the socket provided by the two socket members 11 and 12. When the proper adjustment has been obtained one of the holes in the flange 32 on socket member 12 will register with one of the holes or apertures 28 in the flange 27 on socket member 11 and the locking bolt 13 may then be inserted through these registering holes and threaded down to a tight condition to positively lock the two socket members against relative rotation.

If desired, the distance between the series of holes in one or both of the flanges 27 and 32 may be progressively varied in order to provide a finer adjustment between the two socket members and still have one hole in the flange 32 register with one of the holes in the flange 27.

The locking bolt 13 has an elongated shank 41 and a cylindrical head 42 at one end of the shank the head being provided with a transverse aperture. A set of screw threads 43 is provided at the other end of the shank and a conical shoulder 44 is provided on the shank at the adjacent side of the head 42. A cross pin 35 extends through the transverse aperture in head 42 to provide a handle for turning the bolt. When the bolt is inserted through registering apertures in the flanges 32 and 27 and threaded down, the conical shoulder 44 will engage in the upper end of hole or aperture 33 in the flange 32 providing a tight joint between the bolt and this flange.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A trailer hitch comprising a bolt having a spherical ball on one end, an annular collar adjacent said ball and a screw threaded shank at the side of said collar opposite said ball, a first socket member having a bolt receiving aperture in one end and a partly spherical concavity surrounding said aperture and receiving the portion of said ball adjacent said collar, said first socket member also having an internally screw threaded annular wall extending from said one end in surrounding relationship to said concavity and having at its other end an outwardly extending annular flange provided with a plurality of angularly spaced apart apertures, a second socket member having a screw threaded plug portion threaded into the annular wall of said first socket and provided in one end with a partly spherical concavity receiving the portion of said ball remote from said collar, said second socket member having at the other end of said plug portion an outwardly extending annular flange provided with a plurality of angularly spaced apart apertures and a screw threaded shank extending from said other end of said plug portion substantially coaxial with the latter, and a bolt receivable in an aperture in the flange of said second socket member and threadable into a registering aperture in the flange of said first socket member to lock said socket members against relative rotation.

2. A trailer hitch comprising a two part socket and a ball bolt having a ball end secured in said socket, one of said socket parts comprising a hollow body having a cylindrical inner surface provided with screw threads and a non-circular outer surface and having a partly spherical internal cavity at one end and an aperture extending from said cavity through the adjacent end of said body to receive said ball bolt, and an apertured flange surrounding said body at the other end thereof, and the other part of said socket comprising a screw threaded plug threadable into said one part and having in one end a partly spherical concavity which constitutes with the partly spherical concavity in said one part a generally spherical space receiving the ball end of said ball bolt, said other socket part also including an apertured flange surrounding the other end of said plug and a screw threaded shank extending from said other end of the plug substantially coaxial with the plug, at least one of the apertures in one of said flanges being in registry with an aperture in the other of said flanges when said socket members are threaded together to secure the ball end of said ball bolt therebetween, and fastening means extending through the registering apertures in said flanges to releasably secure the socket members against relative rotation.

PETER R. LEON.

REFERENCES CITED

The following references are of record in the file of this patent:

UNITED STATES PATENTS

| Number | Name | Date |
| --- | --- | --- |
| 2,150,010 | Solomon | Mar. 7, 1939 |
| 2,167,984 | Leighton | Aug. 1, 1939 |

FOREIGN PATENTS

| Number | Country | Date |
| --- | --- | --- |
| 104,206 | Sweden | Apr. 7, 1942 |
| 258,441 | Italy | Apr. 26, 1928 |
| 444,106 | Great Britain | Mar. 5, 1936 |
| 731,180 | France | Aug. 30, 1932 |